Dec. 30, 1930.                F. W. MANNING                1,786,669
          PROCESS OF AND APPARATUS FOR THE DRY DISINTEGRATION
                        AND DEPOSITION OF FIBERS
                           Filed April 23, 1928
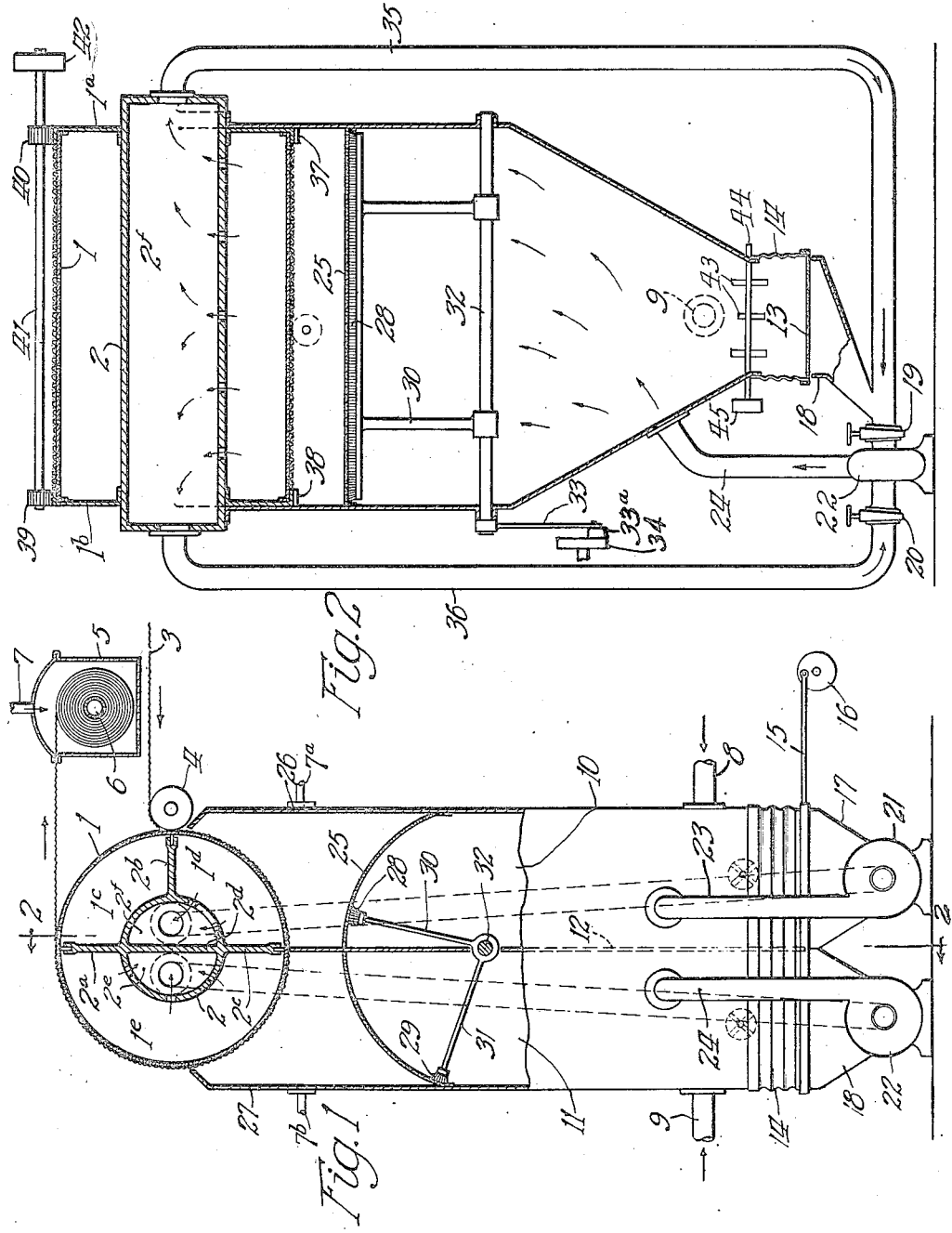
Inventor
Fred W. Manning Patented Dec. 30, 1930

1,786,669

UNITED STATES PATENT OFFICE

FRED W. MANNING, OF BERKELEY, CALIFORNIA, ASSIGNOR, BY MESNE ASSIGNMENTS, TO FILTER FABRICS, INC., OF BOSTON, MASSACHUSETTS, A CORPORATION OF MASSACHUSETTS

PROCESS OF AND APPARATUS FOR THE DRY DISINTEGRATION AND DEPOSITION OF FIBERS

Application filed April 23, 1928. Serial No. 272,336.

This invention relates to methods of and apparatus for manufacturing sheet materials designed especially for filtering purposes.

In prior applications I have disclosed methods of manufacturing filter fabrics by disintegrating cellulose materials, asbestos, or the like, and conveying the fiber so prepared in a liquid such as oil or water. This conveying fluid is passed through a textile structure such as scrim, cheesecloth, or other open mesh fabric, the latter being supported on a foraminous plate or screen so that the fabric will screen out and collect the fibrous material conveyed by the liquid. Later the conveying fluid which is left in the scrim or other fabric used my be removed by solvents or drying fluids.

While these processes are very satisfactory for a great variety of purposes, there are some conditions encountered in filtration processes which make it decidedly preferable to avoid the wetting of the cellulose fiber that is necessary in depositing it according to the methods above described. That is, such wetting of the fiber adversely affects the cellulose material for some filtering purposes. It also involves the use of heat in driving off the wetting liquid and therefore adds to the expense of manufacture of the filtering materials.

With these considerations in view, the present invention aims to devise a method of and apparatus for depositing finely divided substances in a dry condition on a fabric or web having a substantial degree of tensile strength.

The materials so deposited may consist of any substances useful in the filtration of liquids, such, for example, as cellulose fiber, asbestos fiber, fuller's earth, decolorizing carbon, kieselguhr, salts of metals, and a great variety of others, either singly or in a mixture. The nature of these materials necessarily will depend very largely on the fluids being filtered and the nature of the ingredients which are to be filtered out of them. These considerations and that of expense of manufacture will also determine, at least in a large measure, the nature of the backing or web on which the finely divided materials are deposited. An open mesh textile fabric, such as scrim, cheesecloth, or the like, usually forms a satisfactory backing, although it may consist of any other suitable sheet material.

The invention aims to produce in this manner filter sheets suitable for a great variety of purposes, such as the clarification, decolorization or other purification of fluids.

The various features of the invention and the manner in which it is proposed to accomplish the objects above stated, will be readily understood from the following description of an apparatus embodying features of this invention.

In the drawings,

Figure 1 is a view partly in side elevation and partly in vertical section of an apparatus constructed in accordance with this invention; and Fig. 2 is a sectional elevation on the line 2—2, Fig. 1.

Preliminary to a detailed description of the apparatus shown in the drawing it may be stated that this apparatus is designed to convey finely divided dry materials suspended in air or other elastic fluid and to direct a current of such fluid laden with said substances in an upward direction through the web of scrim or other backing material, thus depositing the dry materials on the web. The web of fabric or other sheet material is supported at this time against the lower side of a screening surface and is moving continuously through the current of elastic fluid so that a coating of the finely divided materials carried by said fluid is deposited on the lower surface of the web.

It is preferable to produce this deposition of finely divided substances against the influence of gravity, and under a decreasing velocity in order to utilize gravity to take the heavier particles of coating material out of the fluid stream, and thus to permit only the finer particles to be deposited on the moving web of sheet material.

This apparatus also is designed to apply successive coatings of finely divided material to a backing, as is frequently desirable.

The construction shown includes a screening drum 1 having end plates 1ª and 1ᵇ, and a peripheral surface which may either consist of a screen or a perforated metal sheet. Extending centrally through this drum is a suction tube 2 on which the drum is mounted to revolve. Means, which later will be described, is provided to create suction in the tube 2 and thus cause a flow of air or other elastic fluid through the screen 1 and the tube 2. The space in the screening drum 1 is divided by partitions $2^a$, $2^b$ and $2^c$, rigid with the tube 2, into suction areas indicated at $1^e$ and $1^d$ and a "dead" area $1^c$. These partitions thus limit the area of the screening surface which will be subjected to suction. A partition $2^d$ divides the tube 2 into right and left suction areas or suction boxes $2^e$ and $2^f$.

Fabric 3 drawn from a source of supply (not shown) is led over a guide roll 4 to the surface of the screening drum 1, passes partly around said drum, and then leaves the drum, entering a treating chamber 5 where it is wound upon a perforated rotary suction tube 6, the connections from the tube to the suction producing apparatus not being shown.

Suction is created in the tube 2 by two blowers 21 and 22, the intake ends of which are connected by pipes or conductors leading to the suction boxes $2^f$ and $2^e$ respectively. Fig. 2 shows pipes 35 and 36 leading from the suction tube 2 to the intake end of the blower 22 through regulating valves 19 and 20. The discharge ends of these blowers are connected by pipes 23 and 24 to chambers 10 and 11, respectively, in an upright casing 27. It will be observed that the screening drum is mounted in the upper end of the casing 27, part of the drum being enclosed in the casing, and that the space in the casing below the drum is divided by an upright partition 12 into the two chambers 10 and 11, just referred to. The blowers 21 and 22 thus create a continuous flow of air or other elastic fluid upwardly through the chambers 10 and 11 and through the screen 1 and suction tube 2, the entire circulating system of each blower being independent of the other.

The finely divided substances to be coated on the fabric 3 are delivered to the casing 27 through the supply pipes 8 and 9. The finer constituents of these substances are picked up by the currents of fluid flowing through the chambers 10 and 11 and are carried upwardly, against the influence of gravity, toward the screening drum 1. Coarser constituents drop back by gravity into the lower portions of the chambers through decreasing velocity of the conveying fluid and collect on a screen 13 provided at the lower ends of these mixing or disintegrating chambers. The screen 13 is connected to the lower end of the casing 27 by a flexible stocking or sleeve 14, and it is reciprocated horizontally by a connecting rod 15 driven from a crank disk 16, Fig. 1. The fine materials which pass through the screen 13 drop into collecting boxes 17 and 18, respectively, and are drawn into the return currents of fluid flowing to the intakes of the blowers 21 and 22. These blowers later discharge the material into their respective chambers 10 and 11.

A coarse screen 25 extends transversely across the chambers 10 and 11 and divides these chambers into upper and lower sections. The upper sections may be designated as deposition chambers and the lower sections as mixing or disintegrating chambers, depending upon the operations which are performed in these portions of the casing. The screen 25 prevents any large particles from entering the deposition chambers. Its lower side is prevented from clogging by brushes 28 and 29 mounted on the ends of arms 30 and 31, respectively, which are carried by a rock shaft 32. This shaft is rocked by means of a rocker arm 33 to the outer end of which a connecting rod $33^a$ is attached, said rod being driven by a crank disk 34.

For the purpose of agitating the dry substances in the lower part of the casing and breaking up or distintegrating the bunches or lumps of material, it is preferable to locate a rotary beater in the lower part of each chamber. Each beater has arms 43 projecting from a shaft 44 which is provided with a pulley 45 by means of which it may be revolved.

The screening drum 1 may be driven in any convenient manner. As shown, it is provided at its opposite ends with ring gears 37 and 38 meshing with pinions 39 and 40 on a shaft 41, this shaft carrying a pulley 42 by means of which it may be driven from any suitable source of power.

The operation of the apparatus has been partly indicated in the foregoing description. The finely divided materials may be prepared in any suitable manner prior to being delivered to this apparatus, and they are discharged into the casing 27 through the pipes 8 and 9 by screw conveyors, air currents, or in any other suitable manner. The particular method of discharge necessarily will vary with the materials being handled and the nature of the treatment. The finer particles are picked up in the current of elastic fluid, are carried through the screen 25 into the deposition chambers, and are screened or filtered out of the fluid current as they attempt to pass through the web 3 of scrim or other sheet material which is slowly moving across the screening surface of the drum. As the fabric 3 passes through the right-hand chamber 10, Fig. 1, it receives a coating of fiber or other treating solids, and as it moves through the left-hand chamber 11 another layer or coating of solids, which may be of a different character, is applied to the web.

The coated web travels into the treating chamber 5 where it is wound up on the suction tube 6. In this chamber the fabric may be subjected to the action of treating fluids, such as steam, gases of any desired character, or air conveying atomized oil or other treating substances. It is contemplated that such treating substances suspended in air may be used to consolidate the fibers somewhat without wetting them to an objectionable degree. Such treating fluids may also be introduced into the deposition chambers through the pipes $7^a$, $7^b$, Fig. 1.

In this connection it may here be pointed out that the nature of the treating fluid as well as of the elastic fluid used for conveying the finely divided substances will necessarily depend upon the materials handled and the nature of the results desired. In most cases the conveying fluid consists of air, but it may also consist of carbon dioxide, chlorine gas, and the like, or a mixture of gases, and the air or gases may contain water vapor, atomized oil, or other substances in gaseous or vapor form. It may also be desired to subject the finely divided materials passing through the deposition chamber to a carbonizing action by introducing hot gases. Such an action is desirable, for example, in depositing carbonized cellulose materials on an asbestos web.

In depositing the fibers or other finely divided material on the travelling web in the manner above described, the density or compactness of the deposited solids will be afected by the deposition differential pressure of the conveying fluid. This pressure should have a definite relationship to the differential pressure to be used later in performing the filtering process, for if the deposition differential pressure is too high the fibers will be packed excessively and the resistance set up would be unnecessarily high for filtration purposes. On the other hand, if it is too low the filtering action may not be satisfactory. This factor can be controlled more accurately by effecting the deposition against the influence of gravity, as in the apparatus above described, than it can be if gravity is permitted to be a substantial factor in precipitating the fibers.

The fact that two or more kinds of fibers or other materials can be deposited separately, one upon the other, in the apparatus shown is a substantial advantage since it makes it possible for the finer treating solids to be deposited first on the filtrate side of the coating and the coarser solids last or on the unfiltered side. This is the proper succession where one thickness of fabric is to be used at a time for filtration purposes. Where the fabric is used in layers, one superposed upon the other, in filtering, this condition does not apply and it is then usually better to deposit the coarser treating solids first and the finer solids later to fill up the interstices in the first coating.

The invention thus provides a method and apparatus suited to the manufacture of a considerable variety of filter fabrics. The fact that the materials are deposited in a substantially dry condition is an advantage both from the standpoint of economy of manufacture and also because of the character of the filter surface formed. It should be understood, however, that in referring to the solid constituents as being "dry" it is not intended to imply that such constituents have no moisture content, but rather that they are in such a condition that they can be suspended in a current of air or other elastic fluid in an apparatus such as that shown and can be deposited on the fabric backing in the manner described. Such materials may, however, contain a substantial percentage of moisture and may even be treated prior to introduction into the casing of the apparatus shown to give them a certain moisture content.

While the method provided by this invention has been herein disclosed in connection with a certain form of apparatus, it will be understood that the method may be practiced with the aid of a great variety of forms of apparatus, and that it is not dependent upon any specific form of mechanism. The invention also may be embodied in a considerable variety of mechanisms or forms of apparatus without departing from the spirit or scope thereof.

Having thus described my invention, what I desire to claim as new is:

1. That improvement in methods of making filter sheets, which consists in depositing a finely divided filtering substance on a moving web of sheet material, and producing said depositing action against the influence of gravity.

2. That improvement in methods of making filter sheets, which consists in depositing a finely divided filtering substance on a moving web of sheet material, and later subjecting said web with the deposit thereon to the action of a fluid treating medium adapted to modify the condition of the coating so applied.

3. That improvement in methods of making filter sheets, which consists in suspending a finely divided fibrous material in an elastic fluid, and depositing said material while so suspended and against the action of gravity on a moving web of sheet material and thereby coating said web with said fibrous material.

4. That improvement in methods of making filter sheets, which consists in conveying a dry finely divided filtering substance in a current of elastic fluid, passing said current through a continuously moving web of sheet material adapted to screen said finely divided substance out of said current of fluid and thereby form a coating of said substance on said web, and subsequently treating said coated web with a fluid medium adapted to consolidate the coating so applied to said web.

5. That improvement in methods of making filter sheets, which consists in conveying a dry finely divided filtering substance in a current of elastic fluid, separating the coarser constituents of said substance from the finer constituents while the material is so conveyed, and passing said current of fluid conveying the said finer constituents through a continuously moving web of sheet material adapted to take up said substance and thereby coat said web with said finer constituents of the said substance.

6. That improvement in methods of making filter sheets, which consists in conveying a finely divided filtering substance in an upward direction while suspended in a current of elastic fluid, and passing said current through a continuously moving web of sheet material adapted to screen said finely divided substance out of said current of fluid and thereby to form a coating of said substance on said web.

7. That improvement in methods of making filter sheets which consists in conveying a finely divided filtering substance in an upward direction while suspended in a current of elastic fluid, screening said substance while so suspended, and passing said current conveying the screened substance through a continuosuly moving web of sheet material adapted to take said screened substance out of said current of fluid and thereby to form a coating of said substance on said web.

8. That improvement in methods of making filter sheets which consists in suspending finely divided substances having different characteristics in independent currents of elastic fluid, and passing said currents successively through a moving web of sheet material adapted to screen said substances out of said fluids and thereby deposit coatings of said substances successively on said web.

9. That improvement in methods of making filter sheets, which consists in conveying a dry finely divided substance in a current of elastic fluid, passing said current through a continuously moving web of sheet material adapted to screen said finely divided substance out of said current of fluid and thereby form a coating of said substance on said web, and acting on said substance while on its way to said web to materially change its characteristics.

10. In an apparatus for making filter sheets, the combination of a screen, means for feeding a web of sheet material across said screen and in contact therewith, means for creating a flow of elastic fluid through the portion of said web in contact with said screen, and means for continuously introducing finely divided filtering material into the current of fluid so created to cause said fluid to carry said material to said web and deposit it thereon.

11. In an apparatus for making filter sheets, the combination of a screen, means for feeding a web of sheet material across and under said screen in contact therewith, means for creating a flow of elastic fluid upwardly through the portion of said web in contact with said screen, and means for introducing finely divided material into the current of fluid so created, whereby said fluid will carry said material to said web and deposit it thereon.

12. In an apparatus for making filter sheets, the combination of a casing, a screen mounted in the upper part of said casing, a partition dividing said casing into two chambers opening to the surface of said screen, means for feeding a web of sheet material under and in contact with the surface of said screen and through both of said chambers, means for creating currents of elastic fluid flowing upwardly through portions of said web in contact with said screen and in said chambers, and means for introducing finely divided materials having different characteristics into the respective currents of fluid in said chambers, whereby said currents will carry said materials to said web and deposit them successively on the web as it is fed through the casing.

13. In an apparatus for making filter sheets, the combination of a casing, a screen mounted in the upper part of said casing, means for feeding a web of sheet material across the lower side of said screen in contact therewith and through the space in said casing, means for creating a flow of elastic fluid upwardly through said screen and the web supported thereon, means for introducing finely divided material into the current of fluid so created as it moves toward said screen, and a second screen in said casing through which said current and the dry materials carried thereby are caused to flow on their way to the first screen.

14. In an apparatus for making filter sheets, the combination of a rotary screening drum, means for guiding a web of sheet material to and from the screening surface of said drum to cause it to partly encircle the drum, means for creating a flow of elastic fluid through the portion of said web supported by the drum, and means for introducing finely divided material into the current of air so created to cause said current to carry said material to said web and deposit it thereon.

15. In an apparatus for making filter sheets, the combination of a rotary screening drum, means for guiding a web of sheet material to and from the screening surface of said drum to cause it to partly encircle the drum, a casing associated with said drum and in which a portion of said drum is enclosed, mechanism for rotating said drum, means for creating a flow of elastic fluid through said casing and the portion of the screening surface on which said web is supported, and means for introducing finely divided material into the current of fluid so created in a region where said current moves toward said screening surface.

16. In an apparatus for making filter sheets, the combination of a casing, a rotary screening drum mounted in the upper part of said casing, a blower for creating suction in said drum and thereby directing a current of elastic fluid through the screening surface of said drum, means in said drum for limiting the area of the screen subjected to said suction, means for guiding a web of sheet material into contact with said drum to cause it to move across said area of said screen, and means for introducing finely divided material into the current of air flowing toward said screen.

17. In an apparatus for making filter sheets, the combination of a casing, a rotary screening drum mounted in the upper part of said casing, a partition in said casing dividing the space therein into chambers through which a given area of the screening surface of said drums travels successively, blowers for creating suction in said drum and causing independent currents of elastic fluid to flow through said chambers, parts in said drum for limiting the area of the screen subjected to the suction created by said blowers, and means for introducing finely divided dry materials having different characteristics into the currents of fluid flowing through said respective chambers.

18. That improvement in methods of making filter sheets, which consists in conveying a dry finely divided filtering substance in a current of elastic fluid, passing said current through a web of sheet material adapted to screen said finely divided substance out of said current of fluid and thereby form a coating of said substance on said web, and moving said web through said current to distribute said coating over the surface of said web.

FRED W. MANNING.